United States Patent [19]

Lasmo

[11] 4,120,104
[45] Oct. 17, 1978

[54] SHOE FOR CROSS-COUNTRY SKIING

[75] Inventor: Raimo Juhani Lasmo, Espoo, Finland

[73] Assignee: Karku-Titan Oy, Finland

[21] Appl. No.: 774,144

[22] Filed: Mar. 3, 1977

[30] Foreign Application Priority Data

Mar. 9, 1976 [FI] Finland ................... 760599

[51] Int. Cl.² .................... A43B 5/04; A43C 13/08
[52] U.S. Cl. ................................... 36/117; 36/14
[58] Field of Search ............... 36/117, 118, 119, 120, 36/121, 14, 16, 32 R; 30/30 R; 12/142 RS

[56] References Cited

U.S. PATENT DOCUMENTS 3,070,909  1/1963  Binder et al. ................... 36/14

FOREIGN PATENT DOCUMENTS 1,191,833  10/1959  France ................... 36/14
1,207,136  2/1960  France ................... 36/16

Primary Examiner—Patrick D. Lawson
Attorney, Agent, or Firm—Steinberg & Blake

[57] ABSTRACT

A shoe, particularly for cross-country skiing, has an upper provided at a front tip region of the shoe with a layer of sheet material having an outer surface situated at the exterior of the shoe. This layer of sheet material has a lower edge region which extends outwardly away from an insole of the shoe. The shoe includes an outsole in the form of a casting made in a suitable mold or die. The above outwardly extending lower edge region of the layer of sheet material at the front tip of the upper is embedded in the outsole during the casting thereof so as to achieve in this way a secure connection between the shoe upper, particularly at its front tip region, and the outsole.

5 Claims, 6 Drawing Figures

SHOE FOR CROSS-COUNTRY SKIING

BACKGROUND OF THE INVENTION

The present invention relates to shoes.

In particular, the present invention relates to shoes of the type used for cross-country skiing.

As is known, shoes of the above type have an upper and/or a lining joined, as by stitching, to the insole of the shoe. Particularly for a shoe of the type used in cross-country skiing, the outsole of the shoe is in the form of a casting, made in a suitable die or mold, and made contiguous with the other components of the shoe.

According to known methods of manufacturing shoes of the above type, the outsole is die cast, for example, under pressure, so as to be contiguous with other parts of the shoe, after the upper or equivalent part of the shoe has been stitched or, for example, cemented to the insole. With conventional cross-country skiing shoes manufactured in this way there is the drawback that the die-cast outsole tends, particularly at the tip of the shoe, to become detached at its upper edge from the upper, or from the protective guard which is situated at the upper at the front tip region thereof.

As is well known, in shoes, particularly of the type used for cross-country skiing, there is at the tip thereof and along the sides of the tip a welt by means of which the shoe is capable of being attached to a ski by way of a suitable ski binding. It is also known to provide the tip portion of shoes of the above type with reinforcements situated within the die-cast outsole of the shoe. With shoes of this general type experience has shown that difficulty is encountered in conventional shoe constructions in maintaining the outsole securely connected with the upper.

SUMMARY OF THE INVENTION

It is thus a primary object of the present invention to provide a shoe construction according to which for shoes such as cross-country skiing shoes, the cast outsole will be reliably connected with the other structure of the shoe.

In particular it is an object of the present invention to provide a shoe according to which the outsole has a particularly secure connection at the front tip region of the shoe.

However, it is also an object of the present invention to provide a shoe according to which the material of the cast outsole is used in part for holding together other components of the shoe.

According to the invention, prior to casting the outsole in a suitable mold or die, a layer of sheet material at the front tip region of the upper, which has an outer surface situated at the exterior of the shoe, is provided with an outwardly extending lower edge region, extending forwardly and laterally from the front tip region of the upper, outwardly away from the insole of the shoe. After the shoe is thus provided with this outwardly extending lower edge region at the front tip of the upper, the outsole is cast in a suitable mold or die with this outwardly extending lower edge region being embedded in the outsole, so as to achieve in this way an exceedingly secure connection of the outsole to the remainder ot the shoe, particularly at the front tip region thereof.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
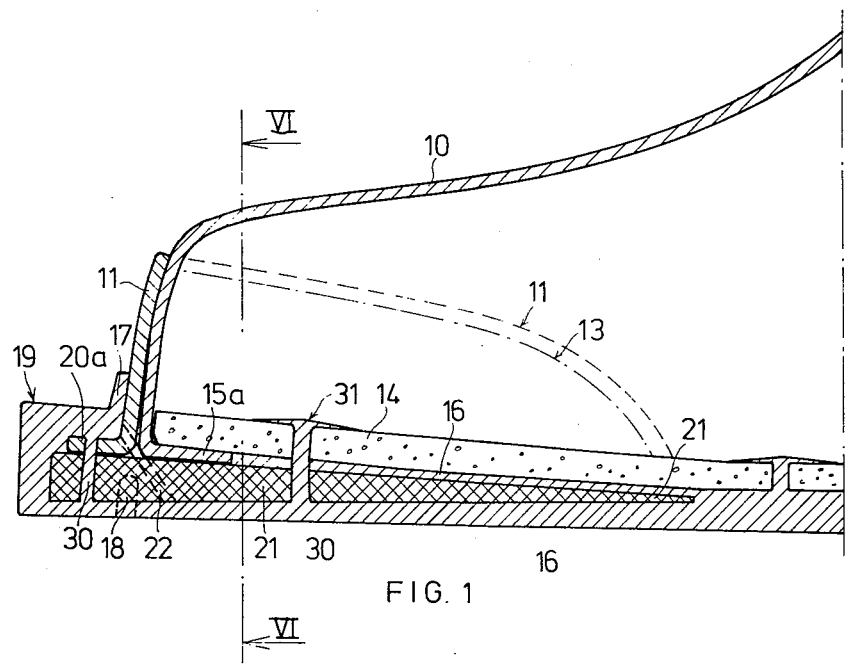
FIG. 1 is a schematic fragmentary longitudinal sectional elevation of one possible construction of a shoe of the invention, the structure of FIG. 1 being situated at the front region of the shoe.
Figure 6:
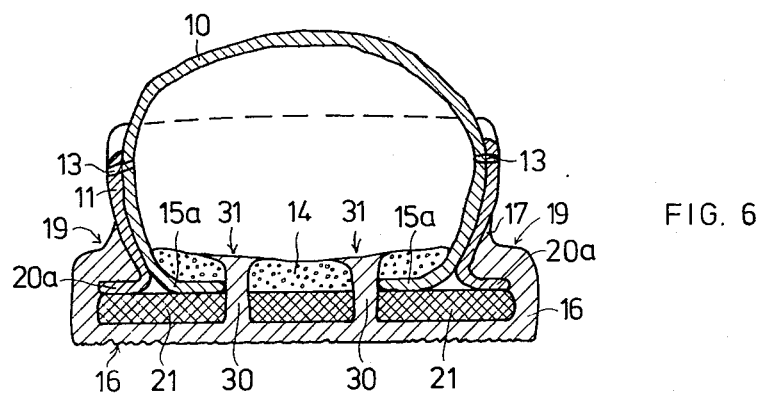
FIG. 6 is a transverse section of the structure of FIG. 1 taken along line VI—VI of FIG. 1 in the direction of the arrows.

Referring to FIGS. 1 and 6, the shoe of the invention fragmentarily illustrated therein includes an upper 10 having a lower edge region 15a which extends inwardly and which is fixed to an insole 14 as by being stitched or cemented thereto with the inwardly extending lower edge region 15a of the upper 10 extending beneath the insole 14 along the entire periphery thereof in the example illustrated in FIGS. 1 and 6. As is conventional, during these operations the upper 10 and insole 14 surround a suitable last. In the embodiment of FIGS. 1 and 6 the upper 10 includes a guard 11 for protecting the front tip region of the shoe. This guard 11 is in the form of a layer of sheet material made of a suitable leather or plastic and having an outer surface which is situated at the exterior of the shoe, as is apparent from FIGS. 1 and 6. The guard 11 is fixed to the remainder of the upper 10 as by being stitched thereto with a line of stitches 13. Thus, the guard 11 has an inner surface engaging the outer surface of that part of the upper which at the front tip region of the shoe has the inwardly directed edge region 15a fastened, as described above, to the insole 14. Thus, the leather or plastic guard 11 will protect the upper 10 against wear and tear, particularly when a relatively narrow ski binding is utilized. With the cross-country skiing shoe shown in FIGS. 1 and 6, the sole is provided with a reinforcing layer 21 made, for example, of a suitable plastic. This reinforcing layer 21 is fixed to the adjoining portions of the incomplete shoe for example by means of the stitching 22 schematically indicated in FIG. 1, although it is also possible to fix the reinforcing layer 22 to the contiguous components by a suitable cement or the equivalent thereof.

Figure 2:
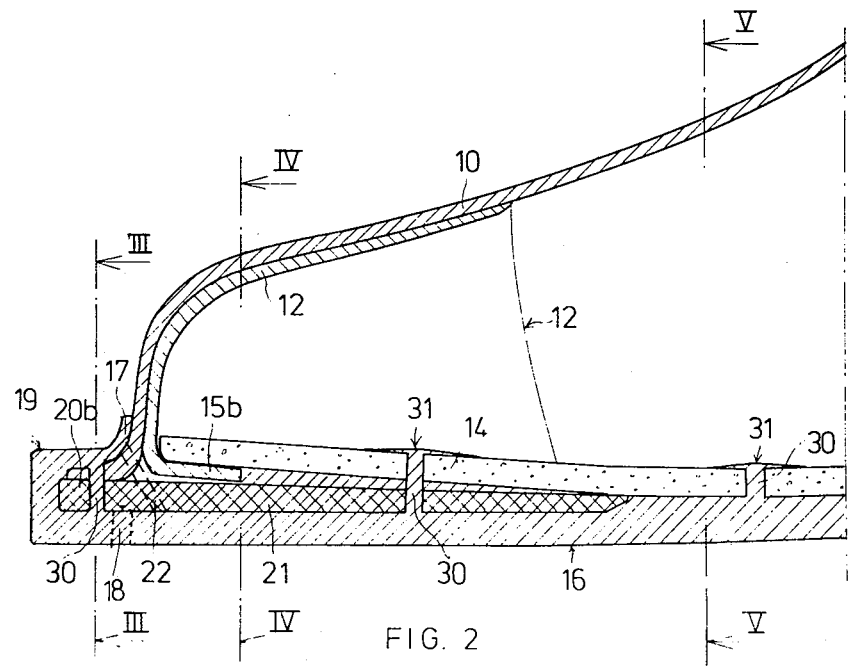
FIG. 2 shows schematically in a longitudinal sectional elevation another embodiment of a shoe and method of manufacturing the same, with the structure of FIG. 2 also being located at the front tip region of the shoe.

In the embodiment of FIG. 2, the upper does not have the guard 11. However in this embodiment the upper includes an inner lining 12 made, for example, of leather and situated at the front tip region of the shoe. The lining 12 is fixed to the inner surface of the upper in any suitable way as by a suitable adhesive or cement. The lining 12 has an inwardly extending lower edge region 15b which extends beneath and is fixed to the insole 14 as by being stitched or cemented thereto. In this embodiment also there is a reinforcing layer 21 situated at the toe or front tip region of the shoe and fixed to the contiguous elements of the shoe as by the stitching 22 schematically shown in FIG. 2 or by suitable cementing or the equivalent thereof.

According to the invention the guard 11 of FIG. 1 has a lower edge region 20a which extends outwardly away from the insole 14 along the entire length of the guard 11 so that this lower edge region 20a forms part of the welt of the shoe. In FIG. 2 the outer layer of sheet material of the upper 10 has a lower edge region 20b which extends outwardly away from the insole 14 along that part of the outer layer of sheet material of the upper 10 which extends around the lining 12. The above outwardly extending lower edge regions 20a and 20b of the uppers of FIGS. 1 and 2 are preferably skived.

Figures 3, 4:
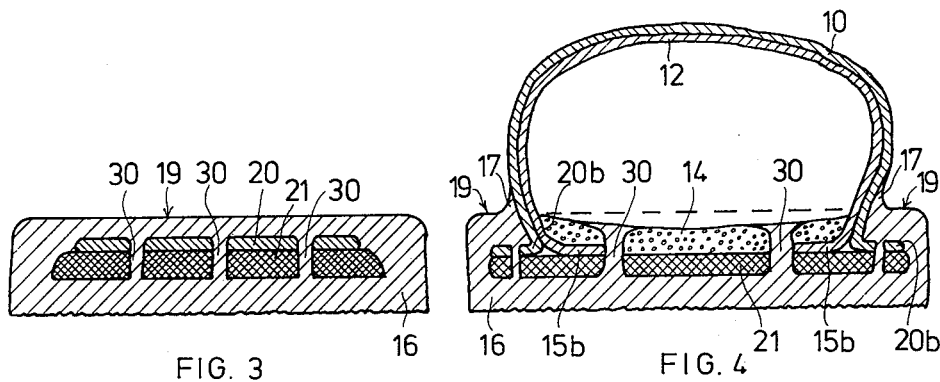
FIGS. 3-5 are respectively transverse sectional elevations taken along lines III—III, IV—IV, and V—V of FIG. 2 in the direction of the arrows.
Figure 5:
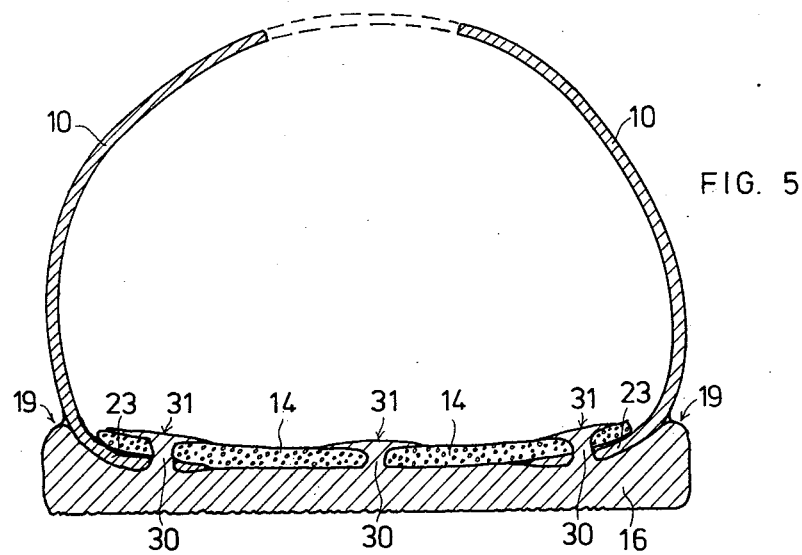

After the upper and insole have been fastened together in the manner set forth above, apertures are formed at suitable locations through the reinforcing layer 21, the insole 14, the outwardly extending lower edge regions 20a and 20b of the outermost layer of sheet material of the upper at the front tip region thereof, and also through the inwardly extending lower edge regions 15a and 15b of the upper. The purpose of these apertures is set forth below. It will be noted, however, that the apertures through contiguous elements are aligned so as to form one continuous aperture. Thus, for example, at the lower left front region of FIGS. 1 and 2 it is indicated that the aperture which extends through the outwardly extending edge regions 20a and 20b continues through the reinforcing layer 21, and of course the same is true of the aperture which extends through overlying parts of the insole 14 and reinforcing layer 21 as well as joined parts of the inwardly extending lower edge region of the upper and the insole, as is apparent from FIG. 5, FIG. 3 indicating the manner in which these apertures are distributed transversely across the lower outwardly extending edge region of the sheet material at the front tip of the shoe. FIG. 4 shows how these apertures extend around to the side of the shoe at the front tip region thereof.

Thus, with the shoe being completed except for having an outsole, it will be seen that the above-described components are fastened to each other and formed with the apertures as set forth above. Of course, a suitable last, which is not illustrated, is situated in the interior of the incomplete shoe.

After the above apertures are formed, the casting of the outsole 16 takes place, this casting being carried out in a suitable mold or die preferably under a certain pressure. Preferably the casting of the outsole 16 is carried out according to well-known die casting techniques with a pressure casting known in itself. As a result of the casting of the outsole 16, there is provided for the shoe a continuous sole of laminated construction having a welt 19 which in itself is known. By way of this welt it is possible to fix the shoe to a ski with a suitable binding. The outsole 16 is poured from a suitable plastic material which penetrates through the above apertures so as to form integrally with the outsole 16 rivet-like fastener structures 30 which extend through the apertures, filling the latter, and which serve in the first place to fix the outsole 16 in a highly reliable manner to the remainder of the components so as to be contiguous therewith while, in particular, the sole components of the shoe, such as the reinforcing layer 21, the insole 14, and the inwardly and outwardly extending lower edge regions of the sheet material of the upper and welt are all contiguous with each other and firmly and reliably fixed with the outsole 16.

Because the last is maintained in the interior of the shoe during the casting of the outsole 16, which is cast under pressure as referred to above, part of the material of the outsole 16 will flow through apertures extending through the insole 14 to engage the surface of the last which is next to the insole 14, thus forming for the rivet-like structure 30 heads 31 which are situated at the upper surface of the insole 14 and which of course are integral with the outsole 16 through the rivet-like portions 30 thereof.

By suitably selecting the locations and sizes of the above apertures it is possible to influence in a decisive manner at the casting of the outsole the strength of the entire structure of the shoe that is manufactured. Moreover, inasmuch as the lower edge region of the outermost layer of sheet material of the upper 10 at the front tip thereof extends outwardly, this lower edge being the edge 20a of the guard 11 of FIG. 1 which is fastened by the stitching 13 to the upper 10 and being the outwardly extending edge region 20b of the upper of FIG. 2, it follows that the outsole 16 particularly at its marginal welt region 19 is reliably fixed to the upper in such a way that there will be no ruptures, as have been previously encountered, between the outsole and the upper at the front tip of the shoe. It is moreover preferred to cast the outsole 16 in such a way that it will have along the lower outer surface of the upper an upwardly extending edge region 17 indicated in FIGS. 1, 2 and 4.

It is to be noted in this latter connection that it is known in the manufacturing of shoes having a welt to stitch or otherwise fix the lower edge region of the upper to the welt and to provide the structure with a special welt band. However, these procedures have not been utilized in connection with casting of an outsole, this casting according to the present invention, particularly by way of the rivet-like structures 30 having the heads 31, providing particularly great advantages.

As is apparent from FIGS. 1 and 6, when the upper includes a front guard 11 the lower edge region 15a of the upper extends inwardly to be joined with the insole 14 over the entire periphery of the insole and upper. However, in the case of FIG. 2 where there is no guard but where the lining 12 is present, the lower front edge region of the outermost layer of the upper extends forwardly at the front tip of the shoe while the lower edge region of the upper extends inwardly to be joined to the insole 14, while rearwardly of the lower edge region 15b of the lining 12 the lower edge region of the upper is extended inwardly to be joined with the insole 14, as is apparent from FIG. 5. Thus, as is apparent from FIG. 5 only the lower edge region 20b of the upper extends forwardly along the front and sides of the lining 12, whereas the upper 10 has the inwardly extending lower edge regions 23 shown in FIG. 5 situated to the rear of the lining 12, with the front edges of the inwardly extending portions 23 being situated directly next to the rear edges of the inwardly extending lower edge region 15b of the lining 12, so that in this way from the lining 12 and the remainder of the upper 10 there is also a continuous inwardly extending lower edge region of the upper extending along the entire periphery of the insole 14 and fastened thereto as set forth above.

Of course, the invention is not to be narrowly confined to the details of the embodiments set forth above only by way of example. For example, the reinforcing layer 21 may differ considerably from what is shown in the drawings. It may extend further to the rear than is illustrated in the drawings, for example. Moreover it is advantageous if the reinforcing layer 21 is preliminarily provided with apertures or recesses according to the standards required by the holes 18 (FIGS. 1 and 2) which are intended to receive spikes of the binding.

Thus, various details of the structure of the invention may vary within the scope of the inventive concept set forth in the claims which follow.

What is claimed is:

1. In a shoe, such as a shoe for cross-country skiing, an upper, an insole fixed thereto, and an outsole in the form of a casting, the improvement wherein said upper has at a front tip region a layer of sheet material having an outer surface situated at the exterior of the shoe with said layer of sheet material having an outwardly extending lower edge region embedded in said outsole, said outwardly extending lower edge region being formed with at least one aperture through which part of said outsole extends, said upper also having an inwardly extending lower edge region fastened to said insole with said insole and inwardly extending edge region being formed with an aperture passing therethrough and filled with material of said outsole.

2. The combination of claim 1 and wherein said layer of sheet material forms part of an outer guard for the tip of the shoe.

3. The combination of claim 1 and wherein said upper includes an inner lining at least at the front tip region of said upper and said inner lining having an inwardly extending lower edge region fastened to said insole.

4. The combination of claim 1 and wherein said insole is formed with an aperture filled with part of the material of said outsole, and the material of said outsole extending beyond the aperture of said insole at an upper surface thereof to form at said insole a rivet-like structure integral with said outsole.

5. In a shoe, such as a shoe for cross-country skiing, an upper, an insole fixed thereto, and an outsole in the form of a casting, the improvement wherein said upper has at a front tip region a layer of sheet material having an outer surface situated at the exterior of the shoe with said layer of sheet material having an outwardly extending lower edge region embedded in said outsole, a reinforcing layer being situated beneath said front tip region of said shoe below said insole and extending beneath and along said outwardly extending lower edge region of said layer of sheet material with said aperture extending not only through said outwardly extending edge region but also through said reinforcing layer and being filled with material of said outsole which passes through said reinforcing layer as well as said outwardly extending edge region of said layer of sheet material.

* * * * *